United States Patent [19]
Dehnert et al.

[11] 4,157,893
[45] Jun. 12, 1979

[54] UNIFORMLY DYED WATER-SWELLABLE CELLULOSIC FIBERS

[75] Inventors: Johannes Dehnert, Ludwigshafen; Guenter Dunkelmann, Hassloch, both of Fed. Rep. of Germany

[73] Assignee: BASF Aktiengesellschaft, Rheinland-Pfalz, Fed. Rep. of Germany

[21] Appl. No.: 894,617

[22] Filed: Apr. 7, 1978

[30] Foreign Application Priority Data

Apr. 9, 1977 [DE] Fed. Rep. of Germany ....... 2715984

[51] Int. Cl.² .............................................. C09B 27/00
[52] U.S. Cl. ........................................ 8/41 R; 8/21 C; 8/22; 8/39 R; 8/41 C; 8/54.2; 8/93
[58] Field of Search ...................... 8/41 R, 21 C, 54.2, 8/93

[56] References Cited

U.S. PATENT DOCUMENTS

| | | | |
|---|---|---|---|
| 3,667,897 | 6/1972 | Blackwell et al. | 8/21 C |
| 3,706,525 | 12/1972 | Blackwell et al. | 8/21 C |
| 3,711,245 | 1/1973 | Neumer | 8/21 R |
| 3,752,645 | 8/1973 | McGuire | 8/21 C |
| 3,752,646 | 8/1973 | Blackwell | 8/21 C |
| 3,752,647 | 8/1973 | Mentzer | 8/21 C |
| 4,049,377 | 9/1977 | Schwab et al. | 8/21 C |

FOREIGN PATENT DOCUMENTS

2524243 12/1976 Fed. Rep. of Germany.

*Primary Examiner*—A. Lionel Clingman
*Attorney, Agent, or Firm*—Oblon, Fisher, Spivak, McClelland & Maier

[57] ABSTRACT

Uniformly dyed water-swellable cellulosic fibers obtained by dyeing cellulosic fibers in the swollen state with a dye of the formula

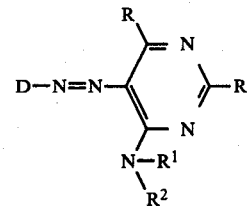

in which one R is $R^1$, $OR^1$, $SR^1$ or

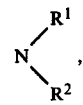

the other R is

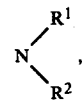

$R^1$ and $R^2$ independently of one another are hydrogen or an aliphatic, cycloaliphatic, araliphatic or aromatic radical,

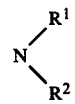

may also be a saturated heterocyclic radical, and D is the radical of a diazo component. The dyed fibers exhibit very good fastness properties.

8 Claims, No Drawings

UNIFORMLY DYED WATER-SWELLABLE CELLULOSIC FIBERS

The invention relates to uniformly dyed water-swellable cellulosic fibers which are fast to washing, dry-cleaning, sublimation and light and have been produced by contacting water-swellable cellulose fibers sequentially or concomitantly with water, ethylene glycol or a derivative thereof and, while the fibers are still swollen, an essentially water-insoluble dye of the formula I

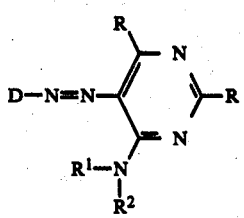

where one R is $R^1$, $OR^1$, $SR^1$ or

the other R is

$R^1$ and $R^2$ independently of one another are hydrogen or an aliphatic, cycloaliphatic, araliphatic or aromatic radical,

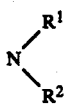

may also be a saturated heterocyclic radical, and D is the radical of a diazo component.

The radicals D are in particular derived from amines of the benzene, naphthalene, benzthiazole, benzisothiazole, thiazole, thiadiazole, indazole, pyrazole, thiophene, azobenzene, phthalimide, naphthalimide or anthraquinone series.

Examples of substituents of the radicals D of the diazo component are:

In the benzene series: fluorine, chlorine, bromine, nitro, cyano, trifluoromethyl, methylsulfonyl, ethylsulfonyl, phenylsulfonyl, a carboxylic acid ester group, eg. alkoxycarbonyl (where alkoxy is of 1 to 8 carbon atoms), phenoxy carbonyl, phenoxyethoxycarbonyl or β-alkoxyethoxycarbonyl (where alkoxy is of 1 to 4 carbon atoms), unsubstituted, N-monosubstituted or N,N-disubstituted carboxamide or sulfonamide, methyl, ethyl, butyl, octyl, hexyl, methoxy or ethoxy, carboxyl, 3-alkyl-1,2,4-oxdiazolyl (where alkyl is of 1 to 4 carbon atoms) and 3-phenyl-1,2,4-oxdiazolyl; examples of the N-substituents of carboxamide or sulfonamide are methyl, ethyl, phenyl, benzyl, phenylethyl, cyclohexyl, norbornyl, propyl, butyl, β-hydroxyethyl, γ-hydroxypropyl, β-methoxyethyl, γ-methoxypropyl and γ-ethoxypropyl, or the amide group in question may be the pyrrolidide, piperidide or morpholide.

In the azobenzene series: fluorine, chlorine, bromine, nitro, cyano, trifluoromethyl, methyl, ethyl, carboxyl, methoxy and ethoxy, as well as the carboxylic acid ester, optionally substituted carbamoyl and sulfamoyl radicals mentioned in connection with the benzene series, and hydroxyl.

In any of the heterocyclic series: chlorine, bromine, nitro, cyano, methyl, ethyl, phenyl, methoxy, ethoxy, methylmercapto, β-carbomethoxyethylmercapto, β-carboethoxyethylmercapto, carbomethoxy, carboethoxy, acetyl, methylsulfonyl and ethylsulfonyl.

In the anthraquinone series: chlorine, bromine, amino, acetyl, methyl, ethyl, phenylamino, tolylamino, hydroxyl, methoxy, ethoxy, cyano and carboxyl.

In the benzene and naphthalene series, preferred diazo components have at least one substituent which reduces the basicity, eg. methylsulfonyl, phenylsulfonyl, ethylsulfonyl, a carboxylic acid ester group, unsubstituted or N-substituted carbamoyl, chlorine, bromine, trifluoromethyl and especially cyano.

$R^1$ and $R^2$ may be hydrogen or, for example, one of the following substituents: alkyl of 1 to 8 carbon atoms, alkyl of 2 to 8 carbon atoms substituted by hydroxyl, cyano, alkoxy of 1 to 8 carbon atoms, phenoxy, tolyloxy, cyclohexoxy, β-phenylethoxy, phenoxyethoxy or benzyloxy, cyclohexyl, norbornyl, benzyl, phenylethyl, phenylhydroxyethyl, phenylpropyl, phenylbutyl, phenyl which is unsubstituted or substituted by chlorine, methyl, trifluoromethyl, pyrrolidonyl, methoxy or ethoxy, polyalkoxyalkyl of 5 to 12 carbon atoms, hydroxypolyalkoxyalkyl of 4 to 9 carbon atoms, alkanoyloxyalkyl, where alkanoyloxy is of 1 to 8 carbon atoms and alkyl is of 2 to 6 carbon atoms, aroyloxyalkyl, where aroyloxy is of 7 to 11 carbon atoms and alkyl is of 2 to 6 carbon atoms, alkylaminocarbonyloxyalkyl, where alkylamino is of 1 to 8 carbon atoms and alkyl is of 2 to 6 carbon atoms, arylaminocarbonyloxyalkyl, where arylamino is of 6 to 10 carbon atoms and alkyl is of 2 to 6 carbon atoms, alkoxycarbonylalkyl, where alkoxy is of 1 to 8 carbon atoms and alkyl is of 2 to 7 carbon atoms, alkanoyl of 1 to 18 carbon atoms, aralkanoyl of 8 to 10 carbon atoms, aroyl of 7 to 11 carbon atoms, alkylsulfonyl of 1 to 4 carbon atoms or arylsulfonyl of 6 to 10 carbon atoms.

Specific examples of radicals $R^1$, in addition to those already mentioned, are:

1. Substituted and unsubstituted alkyl:
$CH_3$, $C_2H_5$, n- and i-$C_3H_7$, n- and i-$C_4H_9$, $C_6H_{13}$, $$CH_2-\underset{\underset{C_2H_5}{|}}{CH}-C_4H_9,$$

$CH_2CH_2OH$, $(CH_2)_3OH$, $$CH_2\underset{\underset{CH_3}{|}}{CHOH}, \quad CH-\underset{\underset{CH_3}{|}}{CH_2OH},$$

$(CH_2)_4OH$, $(CH_2)_6OH$, $$\underset{\underset{CH_3}{|}}{CH}-(CH_2)_3\underset{\underset{OH}{|}}{C(CH_3)_2},$$

(CH$_2$)$_2$O(CH$_2$)$_2$OH, (CH$_2$)$_3$O(CH$_2$)$_4$OH, (CH$_2$)$_3$O(CH$_2$)$_2$OH, (CH$_2$)$_2$CN, (CH$_2$)$_5$CN, (CH$_2$)$_6$CN, (CH$_2$)$_7$CN, (CH$_2$)$_2$O(CH$_2$)$_2$CN, (CH$_2$)$_3$O(CH$_2$)$_2$CN, (CH$_2$)$_2$O(CH$_2$)$_2$O(CH$_2$)$_2$CN, (CH$_2$)$_3$OC$_2$H$_4$OCH$_3$, (CH$_2$)$_3$OC$_2$H$_4$OC$_2$H$_5$, (CH$_2$)$_3$O(CH$_2$)$_6$OH, (CH$_2$)$_3$OC$_2$H$_4$OCH(CH$_3$)$_2$, (CH$_2$)$_3$OC$_2$H$_4$OC$_4$H$_9$, (CH$_2$)$_3$OC$_2$H$_4$OCH$_2$C$_6$H$_5$, (CH$_2$)$_3$OC$_2$H$_4$OC$_2$H$_4$C$_6$H$_5$,

CH$_2$CH$_2$COOH, (CH$_2$)$_5$COOH, (CH$_2$)$_6$COOH, the corresponding radicals in which the groups —O(CH$_2$)$_2$—,

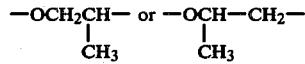

occur two or three times, CH$_2$CH$_2$OCH$_3$, CH$_2$CH$_2$OC$_2$H$_5$, CH$_2$CH$_2$OC$_3$H$_7$, CH$_2$CH$_2$OC$_4$H$_9$, CH$_2$CH$_2$OC$_6$H$_5$, (CH$_2$)$_3$OCH$_3$, (CH$_2$)$_3$OC$_2$H$_5$, (CH$_2$)$_3$OC$_3$H$_7$, (CH$_2$)$_3$OC$_4$H$_9$, (CH$_2$)$_3$OCH$_2$CHC$_4$H$_9$, (CH$_2$)$_3$OC$_6$H$_{13}$, (CH$_2$)$_3$OC$_8$H$_{17}$,
             |
             C$_2$H$_5$

(CH$_2$)$_3$O—, (CH$_2$)$_3$OCH$_2$C$_6$H$_5$, (CH$_2$)$_3$OC$_2$H$_4$C$_6$H$_5$, (CH$_2$)$_3$OC$_6$H$_5$, —CHCH$_2$OCH$_3$, CHCH$_2$OC$_4$H$_9$, CHCH$_2$OC$_6$H$_5$,
            |            |            |
           CH$_3$       CH$_3$      CH$_3$

CHCH$_2$OCH$_2$C$_6$H$_5$, CH$_2$CHOCH$_3$, CH$_2$CH—OC$_2$H$_5$,
|               |             |
CH$_3$          CH$_3$      CH$_3$

CH$_2$CH—OC$_4$H$_9$, CH$_2$CH—OC$_2$H$_4$C$_6$H$_5$, CH$_2$CH—OC$_6$H$_5$,
     |                 |               |
    CH$_3$           CH$_3$          CH$_3$

2. Substituted and unsubstituted cycloalkyl and polycycloalkyl:

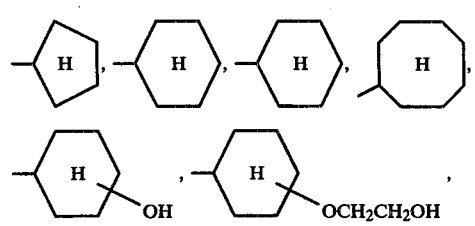

-continued

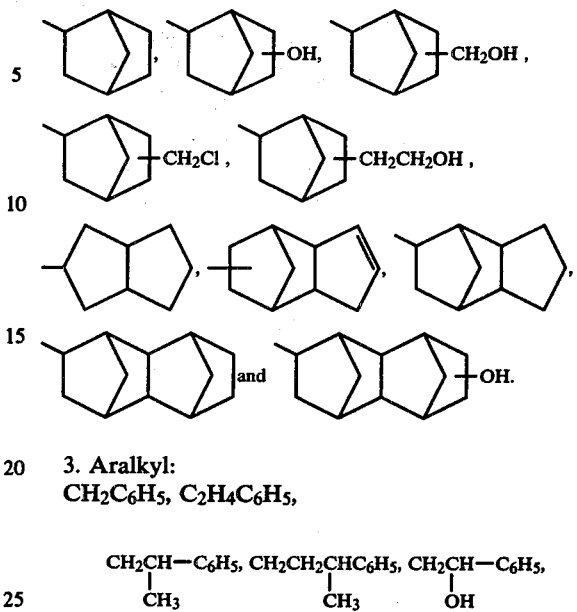

3. Aralkyl:
CH$_2$C$_6$H$_5$, C$_2$H$_4$C$_6$H$_5$,

CH$_2$CH—C$_6$H$_5$, CH$_2$CH$_2$CHC$_6$H$_5$, CH$_2$CH—C$_6$H$_5$,
     |                 |              |
    CH$_3$          CH$_3$         OH and the corresponding radicals with C$_6$H$_4$CH$_3$ instead of C$_6$H$_5$.

4. Unsubstituted and substituted phenyl:
C$_6$H$_5$, C$_6$H$_4$CH$_3$, C$_6$H$_3$(CH$_3$)$_2$, C$_6$H$_4$OCH$_3$, C$_6$H$_4$OC$_2$H$_5$, C$_6$H$_4$OCH$_2$CH$_2$OH and C$_6$H$_4$Cl.

5. The radicals:
CH$_2$CH=CH$_2$, CH$_2$COOCH$_3$, (CH$_2$)$_5$COOCH$_3$, (CH$_2$)$_5$COOC$_2$H$_5$, (CH$_2$)$_5$COOC$_4$H$_9$,

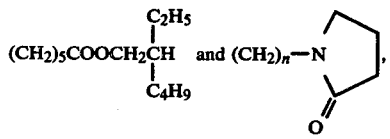

where n is 2, 3, 4 or 6.

6. Acyloxy: (CH$_2$)$_2$OCHO, (CH$_2$)$_2$OCOCH$_3$, (C$_2$H$_4$O)$_2$CHO, (C$_2$H$_4$O)$_2$COCH$_3$, (CH$_2$)$_2$OCOC$_3$H$_7$,

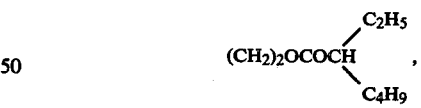

(CH$_2$)$_2$OCOC$_6$H$_5$, (CH$_2$)$_2$OCOC$_6$H$_4$CH$_3$, (CH$_2$)$_2$OCOC$_6$H$_4$Cl, (CH$_2$)$_2$OCOC$_{10}$H$_7$, (CH$_2$)$_2$OCONHCH$_3$, (CH$_2$)$_2$OCONHC$_4$H$_9$,

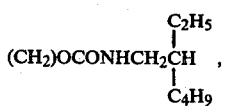

(CH$_2$)$_2$OCONHC$_6$H$_5$, (CH$_2$)$_2$OCONHC$_6$H$_4$Cl, (CH$_2$)$_2$OCONHC$_6$H$_3$Cl$_2$, and the corresponding radicals with (CH$_2$)$_3$, (CH$_2$)$_4$ or (CH$_2$)$_6$.

Examples of preferred substituents R$^1$ are hydrogen, CH$_3$, C$_2$H$_5$, n- and i-C$_3$H$_7$, n- and i-C$_4$H$_9$, C$_6$H$_{13}$, CH$_2$CH$_2$OH, (CH$_2$)$_3$OH,

CH$_2$CHOH,
|
CH$_3$ (CH$_2$)$_4$OH, (CH$_2$)$_6$OH

CH(CH$_2$)$_3$C(CH$_3$)$_2$,
|               |
CH$_3$          OH (CH$_2$)$_2$O(CH$_2$)$_2$OH,      (CH$_2$)$_3$O(CH$_2$)$_2$OH,
(CH$_2$)$_3$O(CH$_2$)$_4$OH, (CH$_2$)$_3$O(CH$_2$)$_6$OH,

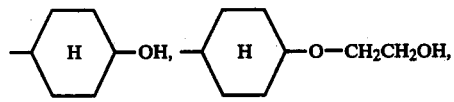

(n=2, 3, 6), CH$_2$CH$_2$OCH$_3$, CH$_2$CH$_2$OC$_2$H$_5$, CH$_2$CH$_2$OC$_4$H$_9$, (CH$_2$)$_3$OCH$_3$, (CH$_2$)$_3$OC$_2$H$_5$, (CH$_2$)$_3$OC$_3$H$_7$, (CH$_2$)$_3$OC$_4$H$_9$,

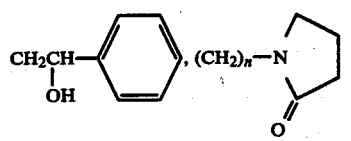

(CH$_2$)$_3$OC$_2$H$_4$OCH$_3$,      (CH$_2$)$_3$OC$_2$H$_4$OC$_4$H$_9$,
(CH$_2$)$_3$OC$_2$H$_4$OC$_6$H$_5$,

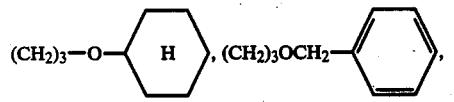

CH$_2$C$_6$H$_5$, C$_2$H$_4$C$_6$H$_5$,

CH$_2$CHC$_6$H$_5$,
|
CH$_3$

C$_6$H$_5$, C$_6$H$_4$CH$_3$, C$_6$H$_4$OCH$_3$, C$_6$H$_4$OC$_2$H$_4$OH and (CH$_2$)$_5$COOH.

Examples of

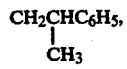

are pyrrolidino, piperidino, morpholino, piperazino and hexamethyleneimino.

The dyes of the formula I can be prepared by reacting a diazo compound of an amine of the formula II

D—NH$_2$                    II with a coupling component of the formula III

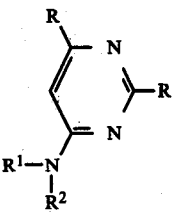

where D, R, R$^1$ and R$^2$ have the stated meaning.

The diazotization of the amines may be carried out in the conventional manner. The coupling may also be carried out in the conventional manner, in an aqueous, slightly to strongly acid medium, with or without addition of a solvent.

In particular, the invention relates to fibers which have been dyed with a dye of the formula I, where D is phenyl which is substituted by cyano, nitro, trifluoromethyl, methyl, fluorine, chlorine, bromine, alkylsulfonyl of 1 to 4 carbon atoms, phenylsulfonyl, oxdiazolyl,

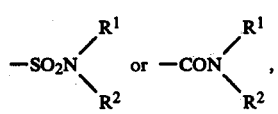

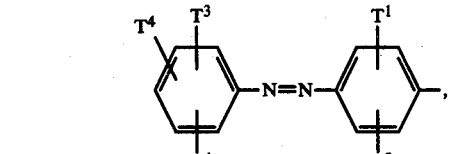

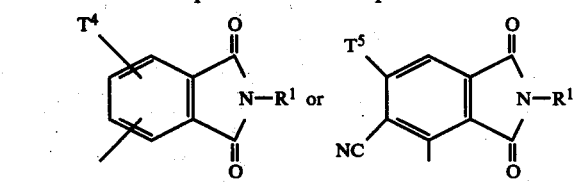

or is anthraquinonyl which is unsubstituted or substituted by methyl, chlorine, bromine or carboxyl, or is benzisothiazolyl substituted by nitro, chlorine or bromine, R$^1$ is hydrogen, alkyl of 1 to 8 carbon atoms, alkyl of 2 to 8 carbon atoms which is substituted by hydroxyl, alkoxy of 1 to 8 carbon atoms, phenoxy, tolyloxy, cyclohexoxy, benzyloxy, β-phenylethoxy, carboxyl, a carboxylic acid ester group of a total of 2 to 9 carbon atoms, C-acyloxy of a total of 1 to 11 carbon atoms, alkylaminocarbonyloxy (where alkyl is of 1 to 8 carbon atoms), phenylaminocarbonyloxy, tolylaminocarbonyloxy, chlorophenylaminocarbonyloxy, dichlorophenylaminocarbonyloxy or pyrrolidonyl, cyclohexyl, norbornyl, phenylalkyl (where alkyl is of 1 to 4 carbon atoms), tolylalkyl (where alkyl is of 1 to 4 carbon atoms), β-phenyl-β-hydroxyethyl, phenyl, which is unsubstituted or substituted by fluorine, chlorine, bromine, methyl, trifluoromethyl, ethyl, methoxy, ethoxy or pyrrolidonyl, CH$_2$CH$_2$OCH$_2$CH$_2$OH or (CH$_2$)$_3$(OC$_2$H$_4$)$_n$OB, n is 0, 1 or 2, B is hydrogen, alkyl of 1 to 4 carbon atoms, cyclohexyl, benzyl, phenylethyl, phenyl or tolyl, $R^2$ is hydrogen, alkyl of 1 to 8 carbon atoms, or alkyl of 2 to 9 carbon atoms substituted by hydroxyl or alkoxy of 1 to 8 carbon atoms, or $R^1$ and $R^2$ together with the nitrogen are pyrrolidino, piperidino, morpholino or hexamethyleneimino, $T^1$ is hydrogen, chlorine, bromine, methyl, methoxy or ethoxy, $T^2$ is hydrogen, methyl, methoxy or ethoxy, $T^3$ is hydrogen, methyl, chlorine, bromine, cyano, nitro, methylsulfonyl,

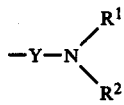

or $COOB^1$, $B^1$ is hydrogen, alkyl of 1 to 8 carbon atoms, phenylalkyl (where alkyl is of 1 to 4 carbon atoms) or $(OC_2H_4)_nOB$, Y is $-SO_2-$ or $-CO-$, $T^4$ is hydrogen, cyano, chlorine or bromine and $T^5$ is hydrogen, methyl or ethyl. Dyes of particular industrial value for the dyeing of the fiber are those which contain a dye or a mixture of dyes of the formula I a

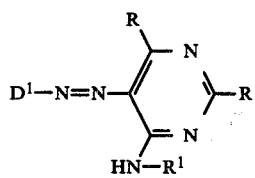

where $D^1$ is a diazo component of the benzene, phthalimide, naphthalimide, anthraquinone or azobenzene series or a nitrobenzisothiazolyl radical and R and $R^1$ have the stated meanings.

The substituents are advantageously chosen so that the molecule contains at least one aryl radical, preferably phenyl, either in the diazo component or in the coupling component.

Preferred dyes are those where at least one of the radicals $R^1$ contains an oxygen-containing amine radical, preferably a radical of one of the amines methoxyethylamine, methoxypropylamine, phenoxyethoxypropylamine, phenoxyethoxyethoxypropylamine, benzyloxypropylamine, phenylethoxypropylamine, butoxyethoxypropylamine, benzoyloxyethylamine, benzoyloxypropylamine, benzoyloxyethoxyethylamine, $H_2N(CH_2)_3O(CH_2)_4OCOC_6H_5$, $H_2N(CH)_2OCONHC_6H_5$, $H_2N(CH_2)_3OCONHC_6H_5$ or $H_2N(CH_2)OCONHC_6H_4Cl$, and dyes where one $R^1$ is derived from an oxygen-containing amine and the other $R^1$ is phenylamino or amino.

Specific examples of amines from which the radical $D^1$ may be derived are o-, m- and p-cyanoaniline, 2,4-dicyanoaniline, 2,4,6-tribromoaniline, 2-trifluoromethylaniline, 2,4-dichloroaniline, 2-cyano-4,6-dibromoaniline, 2,4-dicyano-6-bromoaniline, 4-cyano-2-chloroaniline, 1-amino-2-trifluoromethyl-4-chlorobenzene, 2-chloro-5-aminobenzonitrile, 2-amino-5-chlorobenzonitrile, 1-aminobenzene-4-methylsulfone, 1-amino-2,6-dibromobenzene-4-methylsulfone, 1-amino-2-chloro-4-methylsulfone, 1-amino-2,6-dichlorobenzene-4-methylsulfone, propyl 3,5-dichloroanthranilate, β-methoxyethyl 3,5-dibromoanthranilate, 4-aminoacetophenone, 4- and 2-aminobenzophenone, anthranilate, 4-aminoacetophenone, 4- and 2-aminobenzophenone, 2- and 4-aminodiphenylsulfone, 3- and 4-aminophthalic acid β-hydroxyethylimide, phenylimide and p-tolylimide, 3-amino-6-chlorophthalimide and its N-substitution products, 3-amino-4-cyano-5-methyl- and -ethyl-phthalimide and their N-substitution products, 1-amino-2-chloroanthraquinone, 1-amino-2-bromoanthraquinone, 1-amino-2,4-dibromoanthraquinone, 1-amino-2-acetyl-4-chloroanthraquinone, 1-amino-anthraquinone-6-carboxylic acid, 1-amino-anthraquinone-6-carboxylic acid ethyl ester, 1-amino-4-methoxy-anthraquinone, 1-amino-4-hydroxyanthraquinone, 1-amino-2-chloro-4-p-toluidino-anthraquinone, 2-amino-1-chloro-anthraquinone, 2-amino-3-chloroanthraquinone, 2-amino-3-bromoanthraquinone, 2-amino-1,3-dibromoanthraquinone, 2-amino-1-cyano-3-bromoanthraquinone, 1-, 6- and 7-aminobenzanthrone, 1- and 2-amino-anthraquinone, 1-amino-4-chloroanthraquinone, 2,4-dicyano-3,5-dimethylaniline, 4-aminonaphthalic acid imide, methylimide, n-butylimide, 2-hydroxyethylimide, 3'-methoxypropylimide and phenylimide, 5-nitro-3-amino-2,1-benzisothiazole and 5-nitro-7-bromo-3-amino-2,1-benzisothiazole.

Examples of suitable diazo components of the aminoazobenzene series are: 4-aminoazobenzene, 3-chloro-4-aminoazobenzene, 3-bromo-4-aminoazobenzene, 2',3-dimethyl-4-aminoazobenzene, 3',2-dimethyl-4-aminoazobenzene, 2,5-dimethyl-4-aminoazobenzene, 2-methyl-5-methoxy-4-aminoazobenzene, 2-methyl-4',5-dimethoxy-4-aminoazobenzene, 4'-chloro-2-methyl-5-methoxy-4-aminoazobenzene, 4'-chloro-2-methyl-4-aminoazobenzene, 2,5-dimethoxy-4-aminoazobenzene, 4'-chloro-2,5-dimethoxy-4-aminoazobenzene, 4'-chloro-2,5-dimethyl-4-aminobenzene, 4'-methoxy-2,5-dimethyl-4-aminoazobenzene, 3,5-dibromo-4-aminoazobenzene, 2,3'-dichloro-4-aminoazobenzene, 3-methoxy-4-aminoazobenzene, 2',3-dimethyl-5-bromo-4-aminoazobenzene, 4'-amino-2',5'-dimethylazobenzene-4-sulfonamide and -3-sulfonamide, and the aminoazobenzenes of the formula

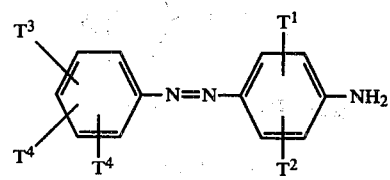

where $T^1$ is hydrogen, chlorine, bromine, methoxy or methyl, $T^2$ is hydrogen, methoxy or methyl $T^3$ is nitro or

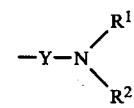

or $COOB^1$, $T^4$ is hydrogen, chlorine, bromine or cyano, Y is $-CO-$ or $-SO_2-$, $B^1$ is an alcohol radical and $R^1$ and $R^2$ have the stated meaning.

From the point of view of their structure, the dyes of the formula I may be described as disperse dyes, which as a rule cannot be applied to, for example, cotton. However, U.S. Pat. No. 3,706,525 describes a process which permits printing such dyes on cellulose and cellulose-containing textile material. The disclosures in the said patent with regard to process conditions also apply in principle to the dyes of formula I. In addition, German Patent Applications P 25 24 243.7 and P 25 28 743.8 disclose further processes by means of which the dyes of formula I can be applied. Amongst these, printing processes are preferred. The above patent and patent applications are incorporated herein by reference.

The dyes of formula I are advantageously applied in the form of dye formulations, whereby dyeings and prints with excellent fastness properties are obtained, amongst which the wetfastness and in some cases also the lightfastness should be singled out. In the case of prints, for example, washing does not result in staining of any white ground which may be present.

The dye formulations contain the dyes of the formula I together with dispersants, water-retaining agents and water, with or without other components conventionally used in dye formulations, eg. disinfectants or antifoam agents.

Suitable dispersants are cationic compounds and, preferably, non-ionic and, in particular, anionic compounds, ie. the dispersants conventionally used for disperse dyes.

Specific examples are ligninsulfonates, sulfomethylation products of phenol, condensation products of phenolsulfonic acids, phenol, formaldehyde and urea, condensation products of β-sulfonaphthalene and formaldehyde, and polyadducts of propylene oxide and ethylene oxide with ethylene glycol, propylene glycol or ethylenediamine.

Water-retaining agents are, in particular, glycols and glycol ethers, eg. ethylene glycol, propylene glycol, diethylene glycol and ethylene glycol monomethyl ether.

In the Examples which follow, parts and percentages are by weight, unless stated otherwise.

EXAMPLE 1

A cotton fabric is printed by rotary screen printing with an ink which comprises 10 parts of the dye of the formula

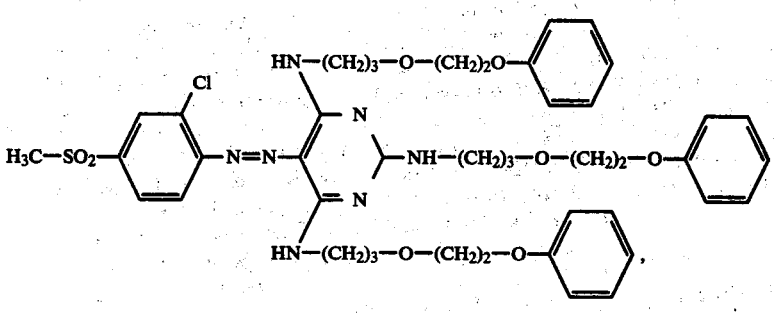

100 parts of a polyethylene oxide of molecular weight 300 and 790 parts of a 3% strength alginate thickener, and the print is dried at 100° C. The print is then treated for 1 minute with hot air at 200° C., rinsed cold, soaped at the boil, again rinsed cold and dried. A lightfast and washfast yellow print on a white ground is obtained.

EXAMPLE 2

A polyester/cotton union fabric (weight ratio 67:35 (sic)) is printed with a paste which comprises 20 parts of the dye of the formula

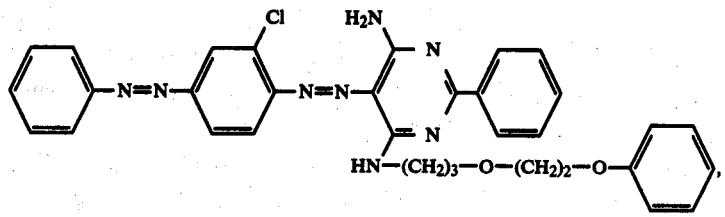

120 parts of the reaction product of a polyethylene oxide of molecular weight 300 with boric acid in the molar ratio of 3:1 and 860 parts of a 10% strength alginate thickener. The print is dried at 105° C. and treated for 6 minutes with live steam at 180° C. It is then rinsed with cold water, soaped at 80° C., rinsed cold and dried.

A lightfast and washfast red print on a white ground is obtained.

EXAMPLE 3

A cotton fabric is roller-printed with a print paste which comprises 15 parts of the dye of the formula

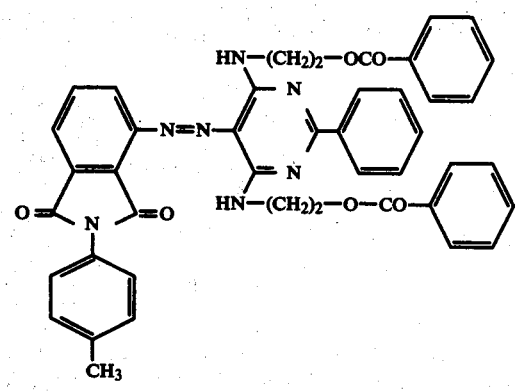

110 parts of a polyethylene oxide of molecular weight 350, 30 parts of oleic acid diethanolamide and 845 parts of a 10% strength alginate thickener. The print is dried at 100° C. and then fixed by treatment with hot air at 195° C. for 1 minute. It is finished as described in Example 1 and a fast golden yellow print on a white ground is obtained.

EXAMPLE 4

A polyester/cotton union fabric (weight ratio 67:33) is printed, on a screen printing machine, with an ink which comprises 30 parts of the dye of the formula

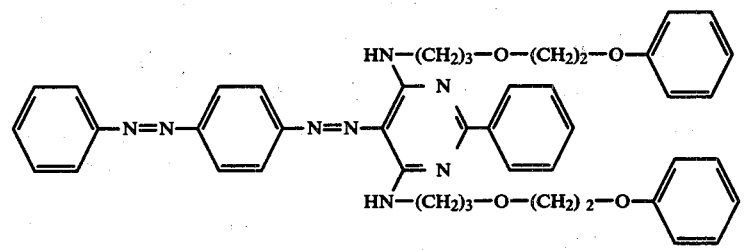

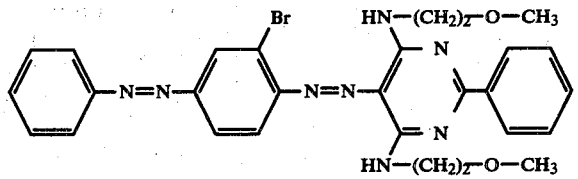

100 parts of the reaction product of a polyethylene oxide of molecular weight 300 with boric acid in the molar ratio of 3:1, 30 parts of oleic acid diethanolamide and 840 parts of a 3% strength alginate thickener, and the print is dried at 110° C. It is then treated for 5 minutes with live steam at 185° C. and is finished as described in Example 2.

A fast yellowish red print on a white ground is obtained.

EXAMPLE 5

A cotton fabric is padded with a solution which contains 20 parts of the dye of the formula

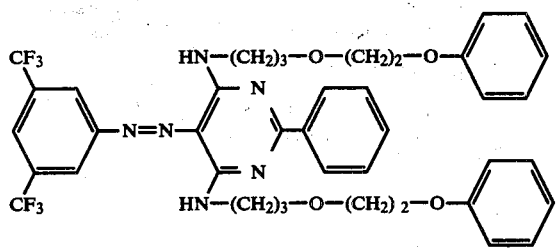

300 parts of a 3% strength alginate thickener, 550 parts of water and 130 parts of a polyethylene oxide of molecular weight 300. The wet pick-up of the fabric is set at 80%. The fabric is dried at 100° C. To fix the dye, it is treated for 5 minutes with live steam at 190° C. The fabric is then rinsed cold and washed at 90° C. in a bath which contains 3 parts of a condensation product of a long-chain alcohol with ethylene oxide per 997 parts of water.

A yellow dying is obtained.

Instead of a cotton fabric, a polyester/cotton union fabric (weight ratio 67:33) can be padded with the above solution. A yellow dyeing in which both types of fiber have the same hue is obtained. Fixing with hot air for 2 minutes at 195° C. may be substituted for the live steam treatment.

EXAMPLE 6

A cotton fabric is padded with a solution of 150 parts of polyethylene oxide in 850 parts of water to give a wet pickup of 80%, and the padded fabric is dried at 100° C. This pretreated fabric is printed by rotary screen printing with an ink which comprises 30 parts of the dye of the formula and 970 parts of a 10% strength alginate thickener. The print is dried at 105° C., treated with live steam at 185° C. for 7 minutes and then finished by rinsing and soaping as described in Example 1.

A fast red print on a white ground is obtained.

The dyes mentioned in the Examples below can be converted to a commercial dye formulation as follows: 30 parts of the dye (which may be in the form of a concentrated solution in dimethylformamide or polyethylene glycols), 6 parts of a dispersant, 10 parts of a water-retaining agent, 1 part of a disinfectant and about 53 parts of water are milled in a stirred ball mill until the particle size is about 0.5 μm. This gives a dye dispersion which is stable on storage.

EXAMPLE 7

20 parts of 4-aminoazobenzene are stirred thoroughly with 120 parts of water and 2 parts of oxyethylated sperm oil alcohol and the suspension is diluted with 30 parts by volume of concentrated hydrochloric acid and stirred for a further 30 minutes. It is then brought to 800 parts by volume with water and 34 parts by volume of a 23% strength aqueous sodium nitrite solution are are run in. The diazotization solution is then stirred for 2 hours at from 30° to 35° C. and is filtered, and excess nitrous acid is destroyed in the conventional manner by adding amidosulfonic acid. The diazonium salt solution thus obtained is then added to a solution of 54 parts of 4,6-bis-phenoxyethoxypropylamino-2-phenyl-pyrimidine in 700 parts by volume of isobutanol and 70 parts by volume of 3-normal hydrochloric acid and 1,000 parts of ice, and the pH of the mixture is brought to 5 with sodium acetate. After completion of coupling, and after working up in the conventional manner, 48 parts of the dye of the formula given in Example 4 are obtained; this dye dissolves easily in dimethylformamide and polyethylene glycols to give a yellowish red solution and when printed, in the form of such a solution or as an aqueous dispersion, onto a polyester or cotton fabric or a polyester/cotton union fabric and aftertreated with hot air or live steam, gives deep clear yellowish red hues.

EXAMPLE 8

12 parts of 3-chloro-4-aminoazobenzene are stirred overnight with 40 parts by volume of concentrated hydrochloric acid. 2 parts of an oxyethylated sperm oil alcohol containing about 23 ethylene oxide units are then added, the mixture is made up to 400 parts by volume with water, and 18 parts by volume of a 23% strength sodium nitrite solution are added to the suspension. After stirring for two hours at 35° C., the solution is filtered and excess nitrous acid is destroyed in the conventional manner by adding amidosulfonic acid.

The resulting diazonium salt solution is run into 160 parts by volume of a solution of 18.5 parts of 2-phenyl-4-amino-6-phenoxyethoxypropylamino-pyrimidine in isobutanol, whilst adding 300 parts of ice. The pH is brought to about 5 with sodium acetate. After completion of coupling, the dye is filtered off, washed with water and dried.

The product, which is in the form of a red powder, is used as an aqueous dispersion or as a solution in a polyethylene glycol to print polyester or cotton fabrics or polyester/cotton union fabrics, and the print is aftertreated with hot air or live steam. Deep clear red hues of very good lightfastness and wetfastness are obtained.

Using the same method, with the same diazo component and with the coupling components shown in the Table below, dyes having similar tinctorial properties are obtained.

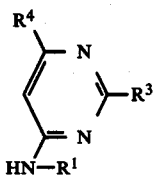

| Example | $R^1$ | $R^4$ | $R^3$ | Hue |
|---|---|---|---|---|
| 9 | —(CH$_2$)$_2$—O—CH$_3$ | —NH—(CH$_2$)$_2$—O—CH$_3$ | —C$_6$H$_5$ | red |
| 10 | —(CH$_2$)$_3$—O—CH$_3$ | —NH—(CH$_2$)$_3$—O—CH$_3$ | " | " |
| 11 | —(CH$_2$)$_3$—O—(CH$_2$)$_2$—O—C$_6$H$_5$ | —NH—(CH$_2$)$_3$—O—(CH$_2$)$_2$O—C$_6$H$_5$ | " | " |
| 12 | —(CH$_2$)$_3$—O—CH$_2$—C$_6$H$_5$ | —NH—(CH$_2$)$_3$—O—CH$_2$—C$_6$H$_5$ | " | " |
| 13 | —(CH$_2$)$_2$—O—CO—C$_6$H$_5$ | —NH—(CH$_2$)$_2$—O—CO—C$_6$H$_5$ | " | " |
| 14 | —H | —NH$_2$ | " | orange |
| 15 | —C$_6$H$_5$ | —NH—(CH$_2$)$_2$—O—(CH$_2$)$_2$—OH | " | red |
| 16 | —(CH$_2$)$_2$—C$_6$H$_5$ | —NH—(CH$_2$)$_2$—C$_6$H$_5$ | " | " |
| 17 | —(CH$_2$)$_2$—C$_6$H$_5$ | —NH(CH$_2$)$_2$—O—(CH$_2$)$_2$—OH | " | " |
| 18 | " | —NH—(CH$_2$)$_3$—OH | " | " |
| 19 | —CH$_2$—C$_6$H$_5$ | —NH—(CH$_2$)$_2$—O—CH$_3$ | " | " |
| 20 | —(CH$_2$)$_3$—O—CH$_2$—C$_6$H$_5$ | —NH—(CH$_2$)$_2$—OH | " | " |
| 21 | —(CH$_2$)$_3$—O—(CH$_2$)$_2$—O—C$_6$H$_5$ | " | " | " |

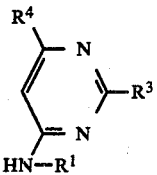

| Example | R¹ | R⁴ | R³ | Hue |
|---|---|---|---|---|
| 22 | —(CH₂)₂—O—CO—CH₂—O—C₆H₅ | —NH—(CH₂)₂—O—CO—CH₂—O—C₆H₅ | " | " |
| 23 | —(CH₂)₃—O—(CH₂)₂—O—C₆H₅ | —CH₃ | —N(C₂H₅)₂ | orange |
| 24 | —CH₂—C₆H₅ | " | —N(CH₃)₂ | " |
| 25 | —C₆H₅ | —O—C₄H₉ | —NH—(CH₂)₂—OH | red |
| 26 | " | —O—C₂H₅ | —NH—C₂H₅ | " |
| 27 | " | —NH₂ | —NH₂ | " |
| 28 | " | —NH—(CH₂)₂—OH | —NH—(CH₂)₂CH₃ | " |

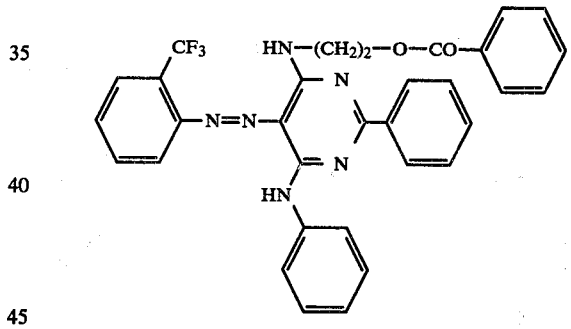

EXAMPLE 29

16 parts of o-trifluoromethylaniline are dissolved in 30 parts by volume of 10-normal hydrochloric acid and 200 parts of water. After adding 200 parts of ice, 30 parts by volume of a 23% strength aqueous sodium nitrite solution are run in under the surface. After stirring for half an hour at from 0° to 5° C., excess nitrous acid is destroyed in the conventional manner by adding an aqueous solution of amidosulfonic acid.

The solution of the diazonium salt is added to a solution of 30 parts of 2-phenyl-4-phenylamino-6-β-hydroxyethylaminopyrimidine in 300 parts by volume of isobutanol and 100 parts by volume of 3-normal hydrochloric acid. After adding 600 parts of ice, the mixture is buffered to pH 4.5 with sodium acetate and the dye suspension is stirred at about 5° C. until coupling has ended. The dye is then filtered off, washed with water and dried.

20 parts of the resulting coupling product, in 100 parts by volume of pyridine, are reacted with 11.2 parts by volume of benzoyl chloride for 2 hours at 60° C. The solution is then diluted with 200 parts by volume of methanol and the dye of the formula is filtered off, washed with methanol and dried. The resulting yellow powder gives a pure yellow solution in dimethylformamide or polyglycols and, when printed on cotton, polyester or a cotton/polyester union fabric and fixed, gives deep clear yellow hues which are very fast.

EXAMPLE 30

5.9 parts of o-aminobenzonitrile are initially dissolved in a little acetone, and then in 150 parts by volume of water and 15 parts by volume of concentrated hydrochloric acid. 150 parts of ice and 16 parts by volume of 23% strength sodium nitrite solution are then added and the resulting solution is stirred for 2 hours at about 5° C. Excess nitrous acid is then destroyed with amidosulfonic acid and the diazonium salt solution is filtered and introduced into a solution of 13.7 parts of 2-phenyl-4,6-bis-β-hydroxyethylamino-pyrimidine in 50 parts by volume of water and 5 parts by volume of concentrated hydrochloric acid. After adding 200 parts of ice, the pH of the mixture is brought to 6 with sodium acetate and the suspension is stirred at 0° C. until coupling has ended. The dye is then filtered off, washed with water and dried.

9 parts of the resulting coupling product, in 200 parts by volume of chlorobenzene, are boiled for 12½ hours with 0.5 part of p-toluenesulfonic acid and 13.7 parts of phenoxyacetic acid. After completion of the reaction, the dye of the formula

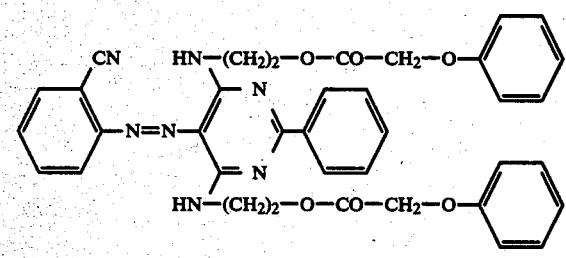

is precipitated with cyclohexane and is purified by dissolving in glacial acetic acid and precipitating with dilute hydrochloric acid. After filtration, washing with water and methanol, and drying, a yellow powder is obtained which gives a neutral yellow solution in polyglycols and, when printed on polyester, cotton or a polyester/cotton union and fixed, gives deep yellow hues with good fastness properties in practical use.

The dyes listed in the Tables which follow are also obtainable by the processes described in the preceding Examples:

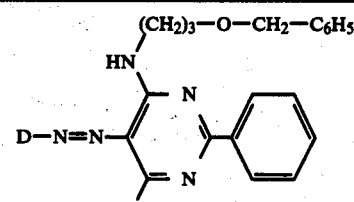

| Ex. | D | Hue on cotton and polyester |
|---|---|---|
| 31 | 2-chloro-aniline-4-methylsulfone | yellow |
| 32 | 2-aminodiphenylsulfone | yellow |
| 33 | 3-aminophthalic acid hydroxyethylimide | yellow |
| 34 | 1-aminoanthraquinone | reddish brown |
| 35 | 1-aminoanthraquinone-6-carboxylic acid | reddish brown |
| 36 | 1-amino-2-chloroanthraquinone | reddish brown |
| 37 | 1-amino-2-bromoanthraquinone | reddish brown |
| 38 | 1-amino-2,4-dichloroanthraquinone | reddish brown |
| 39 | 4-amino-3-methoxybenzanthrone | reddish brown |
| 40 | 2-aminoanthraquinone | red |
| 41 | 2-amino-3-chloroanthraquinone | red |
| 42 | 2-amino-1-chloroanthraquinone | red |
| 43 | 2-amino-1-cyano-3-bromo-anthraquinone | red |
| 44 | 2-amino-3-bromoanthraquinone | red |
| 45 | 1-aminobenzanthrone | reddish violet |
| 46 | 2-amino-5-chloro-benzophenone | yellow |

-continued
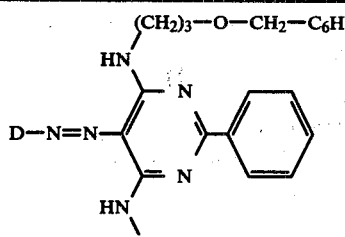
| Example | D | Hue |
|---|---|---|
| 57 | 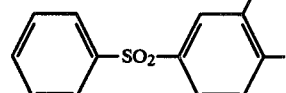 | yellowish orange |
| 58 | 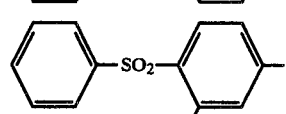 | yellow |
| 59 | 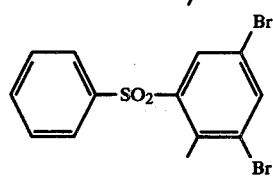 | golden yellow |
-continued
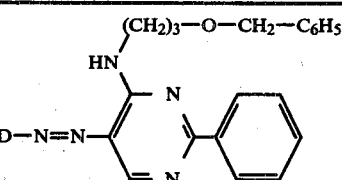
| Example | D | Hue |
|---|---|---|
| 60 | 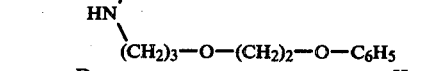 | orange |
| 61 | 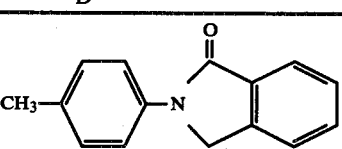 | " |
| 62 | 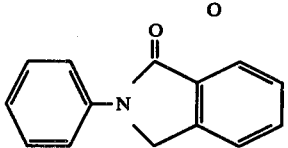 | bluish red |
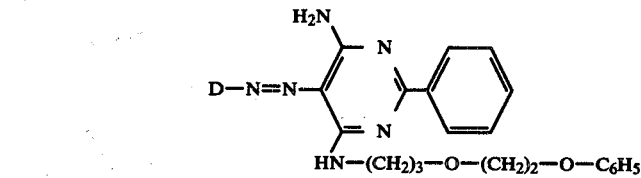
| Example | D | Hue |
|---|---|---|
| 63 |  | orange |
| 64 | 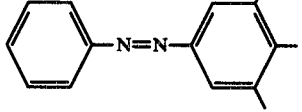 | yellowish red |
| 65 | 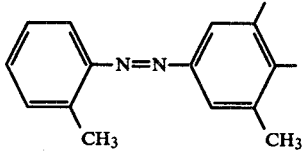 | " |
| 66 | 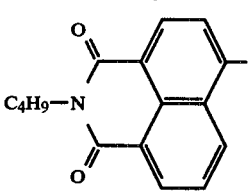 | " |

-continued
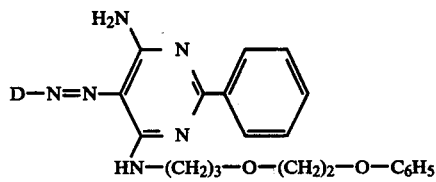
| Example | D | Hue |
|---|---|---|
| 67 |  | " |
| 68 | 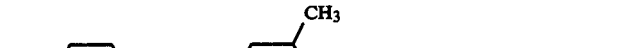 | " |
| 69 | 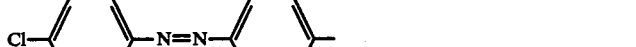 | " |
| 70 |  | " |
| 71 |  | " |
| 72 | 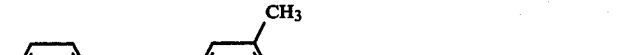 | " |
| 73 |  | yellow |
| 74 |  | " |
| 75 | 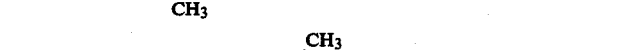 | golden yellow |

-continued
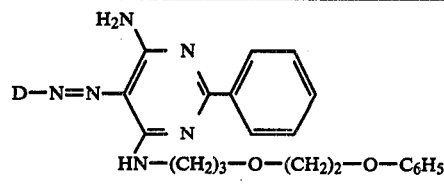
| Example | D | Hue |
|---|---|---|
| 76 | 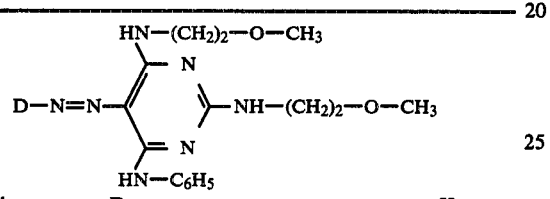 | golden yellow |
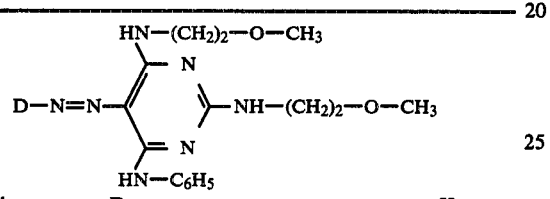
| Example | D | Hue |
|---|---|---|
| 77 | | reddish orange |
| 78 | tolyl) | red |
| 79 | | " |
| 80 | | " |
| 81 | | " |
| 82 | | reddish orange |
| 83 | | reddish orange |
-continued
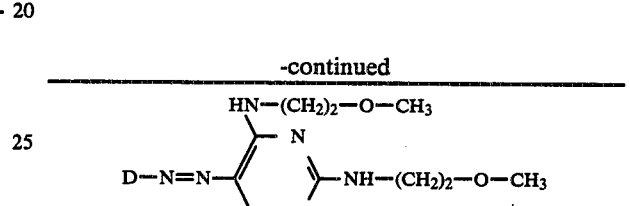
| Example | D | Hue |
|---|---|---|
| 84 | | golden yellow |
| 85 | | " |
| 86 | ![](phenyl phthalimide CH3) | " |
| 87 | ![](tolyl phthalimide CH3) | " |
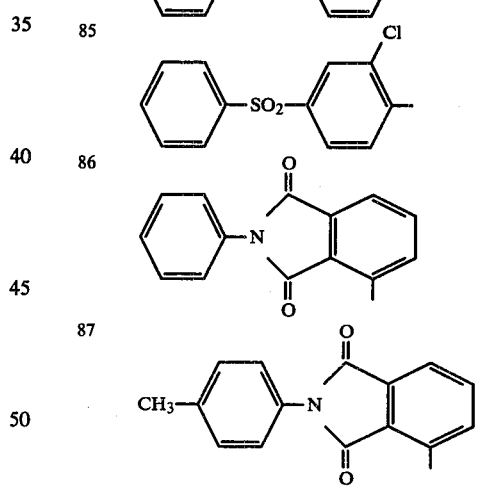
| Example | D | Hue |
|---|---|---|
| 88 | 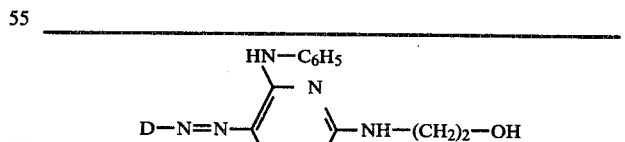 | reddish orange |

| Example | D | Hue |
|---|---|---|
| 89 | 4-methyl-3-methylphenyl azobenzene (phenyl-N=N-(3-CH₃,4-CH₃-phenyl)) | red |
| 90 | 4-chlorophenyl-N=N-(2,5-dimethyl-... 2,6-dimethyl phenyl) | " |
| 91 | 3-chlorophenyl-N=N-(2,5-dimethyl, 2,6-dimethyl phenyl) | " |
| 92 | 2-chlorophenyl-N=N-(2,5-dimethyl, 2,6-dimethyl phenyl) | " |
| 93 | 2-methylphenyl-N=N-(3,4-dimethylphenyl) | reddish orange |
| 94 | 3-methylphenyl-N=N-(2-methylphenyl) | reddish orange |
| 95 | phenyl-SO₂-phenyl | golden yellow |
| 96 | phenyl-SO₂-(3-Br-phenyl) | " |
| 97 | N-phenyl-(4-methyl)phthalimide | " |

| Example | D | Hue |
|---|---|---|
| 98 | N-(4-methylphenyl)-(methyl)phthalimide | " |

| Example | D | Hue |
|---|---|---|
| 99 | 3-chlorophenyl-N=N-(2,5-dimethyl, 2,6-dimethyl phenyl) | yellowish red |
| 100 | 2-chlorophenyl-N=N-(2,5-dimethyl, 2,6-dimethyl phenyl) | " |
| 101 | 2-methylphenyl-N=N-(3-methylphenyl) | reddish orange |
| 102 | 3-methylphenyl-N=N-(3-methylphenyl) | " |
| 103 | phenyl-SO₂-phenyl | yellow |
| 104 | phenyl-SO₂-(3-Br-phenyl) | golden yellow |
| 105 | N-phenyl-(methyl)phthalimide | " |

-continued
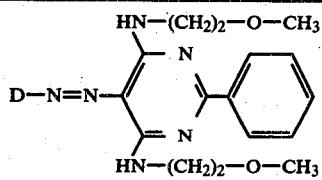
| Example | D | Hue |
|---|---|---|
| 106 | 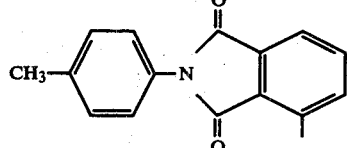 | " |
| 107 | 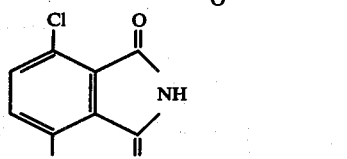 | " |
| 108 | 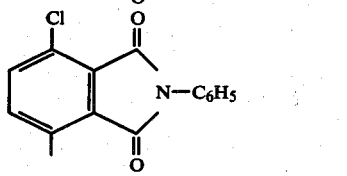 | " |
-continued
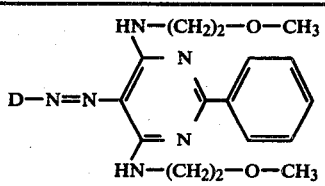
| Example | D | Hue |
|---|---|---|
| 109 | 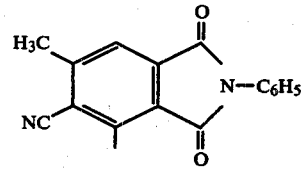 | orange |
| 110 | 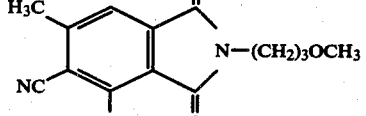 | " |
| 111 | 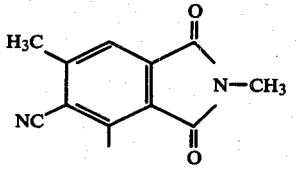 | " |
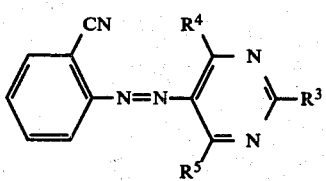
| Example | R⁵ | R⁴ | R³ | Hue |
|---|---|---|---|---|
| 112 | —CH₃ | 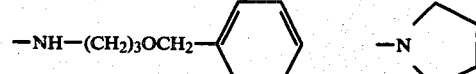 | 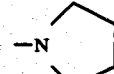 | yellow |
| 113 | " | 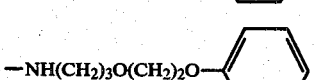 | 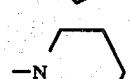 | " |
| 114 | " | 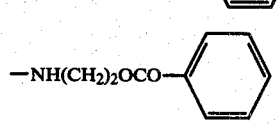 | —N(C₂H₅)₂ | " |
| 115 | —(CH₂)₂—CH₃ |  | —N(CH₃)₂ | " |
| 116 | —NH—(CH₂)₂—O—CH₃ | " | 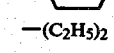 | " |
| 117 | " | 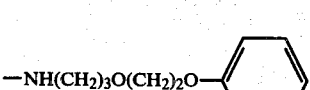 | " | " |
| 118 | " | 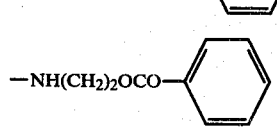 | " | " |

-continued

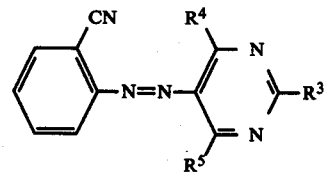

| Example | R⁵ | R⁴ | R³ | Hue |
|---|---|---|---|---|
| 119 | " | —NH(CH₂)₂OCOCH₂O—C₆H₅ | " | " |
| 120 | " | —NH(CH₂)₂OCONH—C₆H₅ | " | " |
| 121 | " | —NH(CH₂)₂OCONH—C₆H₄-4-Cl | " | " |
| 122 | " | —NHCH(CH₃)(CH₂)₃—C(CH₃)₂OH | " | " |
| 123 | —NH—(CH₂)₃O(CH₂)₂—C₆H₅ | —NH(CH₂)₃O(CH₂)₂O—C₆H₅ | 4-Cl-C₆H₄ | " |
| 124 | " | " | 4-CH₃-C₆H₄ | " |
| 125 | " | " | 4-OCH₃-C₆H₄ | " |

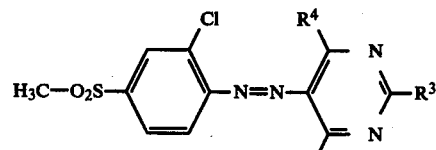

| Ex. | R⁵ | R⁴ | R³ | Hue |
|---|---|---|---|---|
| 126 | —CH₃ | —NH(CH₂)₃—O—CH₂—C₆H₅ | —N(piperidine) | yellow |
| 127 | " | —NH(CH₂)₃O(CH₂)₂O—C₆H₅ | —N(piperidine) | " |
| 128 | " | —NH—CH₂—C₆H₅ | —N(CH₃)₂ | " |
| 129 | —NH—(CH₃)₂—O—CH₃ | —NH—C₆H₅ | C₆H₅ | golden yellow |
| 130 | —NH—(CH₂)₃—OCH₃ | —NH—C₆H₄-4-CH₃ | " | orange |

-continued

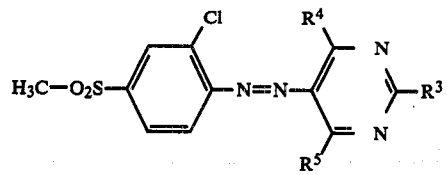

| Ex. | R⁵ | R⁴ | R³ | Hue |
|---|---|---|---|---|
| 131 | $-NH-(CH_2)_2-O-CH_3$ | $-NH-\text{C}_6H_4-OCH_3$ (p) | " | " |
| 132 | $-NH-(CH_2)_6-N\text{(2-oxopiperidinyl)}$ | $-NH-(CH_2)_6-N\text{(2-oxopiperidinyl)}$ | " | golden yellow |
| 133 | $-NH-(CH_2)_5-COO-C_2H_5$ | $-NH-(CH_2)_5-COOC_2H_5$ | " | " |
| 134 | $-NH-(CH_2)_3-O-CH_3$ | $-NH-CH_2-CHOH-CH_2-O-C_6H_5$ | " | " |
| 135 | $-NH-CH_2-CH(OH)-C_6H_5$ | $-NH-CH_2-CH(OH)-C_6H_5$ | " | " |
| 136 | $-NH-(CH_2)_3-O-(CH_2)_2-O-C_6H_5$ | $-NH-(CH_2)_3-O-(CH_2)_2-O-C_6H_5$ | $-C_6H_4-Cl$ (p) | " |
| 137 | " | " | $-C_6H_4-CH_3$ | " |
| 138 | " | " | $-C_6H_4-OCH_3$ | orange |
| 139 | $-NH-(CH_2)_2-O-CH_3$ | $-NH-CH_2-C_6H_5$ | $-C_6H_5$ | golden yellow |
| 140 | " | $-NH-(CH_2)_2-C_6H_5$ | " | " |
| 141 | " | $-NH-CH_2-CH(CH_3)-C_6H_5$ | " | " |
| 142 | " | $-NH-C_6H_{11}$ | " | " |

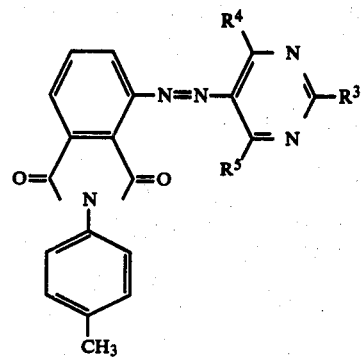
| Example | R⁴ | R⁵ | R³ | Hue |
|---|---|---|---|---|
| 143 | —NH—(CH₂)₂—O—CH₃ | —NH—(CH₂)₂—OH | phenyl | golden yellow |
| 144 | " | —NH—(CH₂)₂—O—CO—phenyl | " | " |
| 145 | " | —NH—(CH₂)₂—O—CO—CH₂—O—phenyl | " | " |
| 146 | " | —NH—phenyl | " | orange |
| 147 | " | —NH—(4-Cl-phenyl) | " | golden yellow |
| 148 | " | —NH—(4-OCH₃-phenyl) | " | orange |
| 149 | " | —NH—CH₂—phenyl | " | golden yellow |
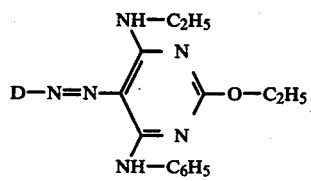
| Example | D | Hue |
|---|---|---|
| 150 | —C₆H₄—N=N—C₆H₄— | reddish orange |
| 151 | phenyl—N=N—(2,5-dibromophenyl)— | red |

-continued $$D-N=N-\underset{\underset{NH-C_6H_5}{|}}{\overset{\overset{NH-C_2H_5}{|}}{C}}=\underset{N}{\overset{N}{C}}-O-C_2H_5$$

| Example | D | Hue |
|---------|---|-----|
| 152 | H₁₇C₈—HN—OC—⟨C₆H₄⟩—N=N—⟨2,5-(CH₃)₂C₆H₃⟩ | " |
| 153 | Cl—⟨C₆H₄⟩—N=N—⟨2,5-(CH₃)₂C₆H₃⟩ | " |
| 154 | ⟨C₆H₅⟩—SO₂—⟨o-CH₃C₆H₄⟩ | golden yellow |
| 155 | ⟨C₆H₅⟩—SO₂—⟨p-CH₃C₆H₄⟩ | " |
| 156 | H₃C—⟨C₆H₄⟩—N(phthalimide-like diketo) | " |
| 157 | 1-methylanthraquinone | brownish red |
| 158 | H₃C—O₂S—⟨3-Cl-C₆H₃⟩ | yellow |
| 159 | CH₃—HNO₂S—⟨2,5-Cl₂C₆H₃⟩ | " |
| 160 | CH₃O(CH₂)₂—HNO₂S—⟨2,5-Cl₂C₆H₃⟩ | " |
| 161 | (tetrahydrofuryl)—O₂S—⟨3-Cl-C₆H₃⟩ | " |

-continued
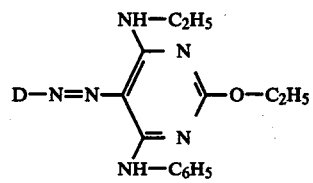
| Example | D | Hue |
|---|---|---|
| 162 | (CH₃)₂—HNO₂S—[3-Cl,4-Me-phenyl] | " |
| 163 | CH₃—HNO₂S—[3-Cl,4-Me-phenyl] | " |
| 164 | (CH₃)₂—HNO₂S—[2,5-diCl,4-Me-phenyl] | " |
| 165 | CH₃O(CH₂)₂—HNO₂S—[3-Cl,4-Me-phenyl] | " |
| 166 | pyrrolidino-O₂S—[3-Cl,4-Me-phenyl] | " |
| 167 | H₅C₆—O—(CH₂)₂—O—(CH₂)₃—NH—O₂S—[3-Cl,4-Me-phenyl] | " |
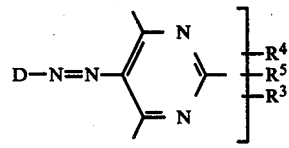
| Example | D | R⁴ | R⁵ | R³ | Hue |
|---|---|---|---|---|---|
| 168 | 2-CF₃-phenyl | —NH(CH₂)₂CH₃ | —NH(CH₂)₂CH₃ | —NH(CH₂)₂—OH | yellow |
| 169 | 1-methylanthraquinonyl | " | " | " | brownish red |
| 170 | 2-CF₃-phenyl | —NH—C₆H₅ | " | " | yellow |
| 171 | " | " | —NH—C₂H₅ | " | " |

-continued

| | | | | | | |
|---|---|---|---|---|---|---|
| 172 | (H3C-C6H4)-N-phthalimide with CH3 | —NH—C2H5 | " | —O—(CH2)2OH | " | |
| 173 | " | —NH—C6H5 | —NH2 | —NH2 | " | |
| 174 | " | " | —NH—C2H5 | —NH(CH2)2OCO—C6H5 | " | |
| 175 | " | " | " | —O—(CH2)2—CH3 | —NH(CH2)2OH | " |
| 176 | " | " | " | —NH—C2H5 | —NH—C2H5 | " |
| 177 | " | " | " | —NH—(CH2)3CH3 | —O—cyclohexyl | " |
| 178 | 2-CF3-methylphenyl | " | " | —NH—CH2—C6H5 | —O—CH2—C6H5 | " |
| 179 | (H3C-C6H4)-N-phthalimide with CH3 | " | " | —NH—CH3 | —O—C2H5 | " |
| 180 | " | " | " | —NH—C2H5 | —S—C2H5 | " |

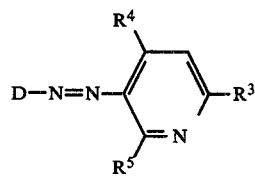

| Example | D | R⁴ | R³ | R⁵ | Hue |
|---|---|---|---|---|---|
| 181 | 2-CN-methylphenyl | NHC2H4OCOC6H5 | C6H5 | NHC6H5 | orange |
| 182 | " | NHC3H6OCH2C6H5 | " | " | orange |
| 183 | " | NHC6H5 | " | " | red |
| 184 | " | C6H5 | N(C4H9)2 | NHC2H4OH | yellow |
| 185 | " | " | " | NHC3H6OC2H4OC6H5 | yellow |
| 186 | " | " | " | NHC3H6OCH3 | yellow |
| 187 | " | " | " | NHC2H4OCH3 | yellow |
| 188 | 2,6-dichloro-4-nitro-phenyl-N=N-(2,5-dimethoxyphenyl) | NH2H4CH3 | C6H5 | " | blue |
| 189 | 2-CF3-methylphenyl | NHC2H4C6H5 | " | NHC2H4C6H5 | blue |
| 190 | " | NHC2H4OH | " | NHC3H6OCH2C6H5 | blue |
| 191 | 2-CF3-methylphenyl | NHC2H4OCH3 | " | NHCH2C6H5 | blue |
| 192 | 1-methylanthraquinonyl | NH2 | " | NHC3H6OC2H4OC6H5 | brown |
| 193 | " | NHC2H4OH | " | NHC3H6OCH2C6H5 | reddish brown |
| 194 | " | CH3 | N(C2H5)2 | NHC6H5 | orange brown |
| 195 | " | " | N(CH3)2 | " | brown |
| 196 | H5C6—N=N—(p-tolyl) | NH2 | C6H5 | NH2 | yellow |
| 197 | " | CH3 | N(C2H5)2 | NHC6H5 | orange |
| 198 | " | " | N(CH3)2 | NHCH2C6H5 | orange |

| | | | | |
|---|---|---|---|---|
| 199 | 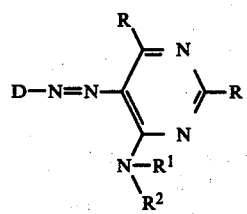 | " | N(C$_2$H$_5$)$_2$ | NHC$_6$H$_5$ | red |
| 200 | 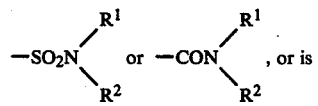 | | C$_6$H$_5$ | NH$_2$ | yellow |

What is claimed is:

1. Uniformly dyed water-swellable cellulosic fibers, said fibers being fast to washing, dry cleaning, sublimation and light, and having been produced by contacting water-swellable cellulose fibers sequentially or concomitantly with water, ethylene glycol or a derivative thereof and, while the fibers are still swollen with an essentially water-insoluble dye of the formula $$D-N=N-\begin{array}{c} R \\ | \\ \text{ring} \\ | \\ N-R^1 \\ | \\ R^2 \end{array}$$

in which one R is R$^1$, or

the other R is

D is phenyl which is substituted by cyano, trifluoromethyl,

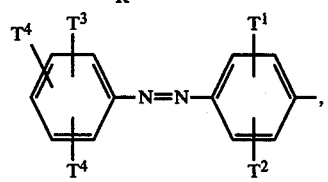

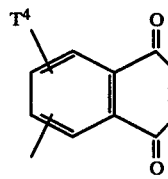

or D is anthraquinonyl which is unsubstituted or substituted by methyl;

R$^1$ is hydrogen, alkyl or 1 to 8 carbon atoms, alkyl of 2 to 8 carbon atoms which is substituted by hydroxyl, alkoxy of 1 to 8 carbon atoms, benzyloxy or β-phenylethoxy; phenylakyl (where alkyl is of 1 to 4 carbon atoms), tolylalkyl (where alkyl is of 1 to 4 carbon atoms), phenyl, which is unsubstituted or substituted by methyl, ethyl or R$^1$ is (CH$_2$)$_3$OC$_2$H$_4$C$_6$H$_5$;

R$^2$ is hydrogen, alkyl of 1 to 8 carbon atoms, or alkyl of 2 to 9 carbon atoms substituted by hydroxyl or alkoxy of 1 to 8 carbon atoms, T$^1$ is hydrogen, chlorine, bromine, methyl, methoxy or ethoxy, T$^2$ is hydrogen, methyl, methoxy or ethoxy, T$^3$ is hydrogen, methyl, chlorine, bromine, nitro, T$^4$ is hydrogen, chlorine or bromine and T$^5$ is hydrogen, methyl or ethyl.

2. The dyed fibers according to claim 1, wherein D is phenyl substituted by cyano, trifluoromethyl,

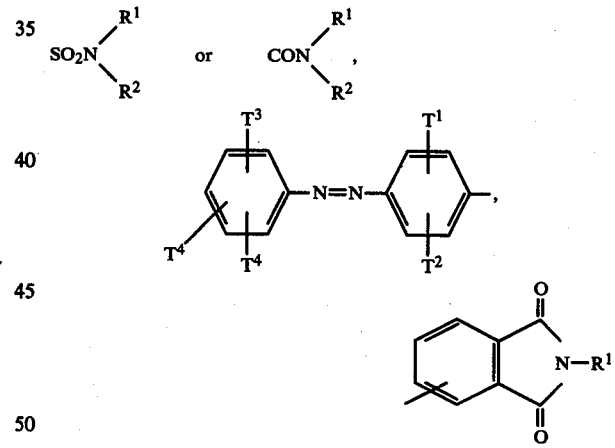

or anthraquinonyl,

R$^1$ is hydrogen, C$_1$ to C$_8$ alkyl, C$_2$ to C$_8$ alkyl substituted by hydroxy, C$_1$ to C$_4$ alkoxy, benzyloxy, β-phenylethoxy; phenyl-C$_1$ to C$_4$-alkyl; phenyl, phenyl substituted by methyl or R$^1$ is (CH$_2$)$_3$(OC$_2$H$_4$)OC$_6$H$_5$, R$^2$ is hydrogen, alkyl of 1 to 8 carbon atoms, alkyl of 2 to 9 carbon atoms substituted by hydroxyl or alkoxy of 1 to 8 carbon atoms, T$^1$ is hydrogen, chlorine, bromine, methyl, methoxy or ethoxy, T$^2$ is hydrogen, methyl, methoxy or ethoxy, T$^3$ is hydrogen, methyl, chlorine, bromine, nitro, T$^4$ is hydrogen, chlorine or bromine and T$^5$ is hydrogen, methyl or ethyl.

3. The fibers according to claim 1 dyed with a dye of the formula

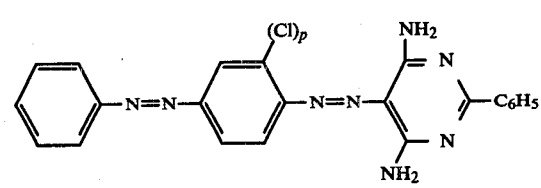
where p is 0 or 1.
4. The fibers according to claim 1 dyed with a dye of the formula
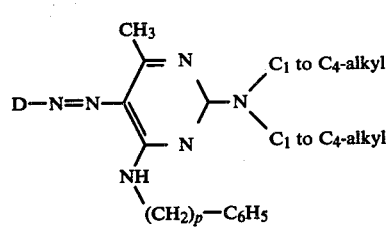
where
p is 0 or 1 and
D is
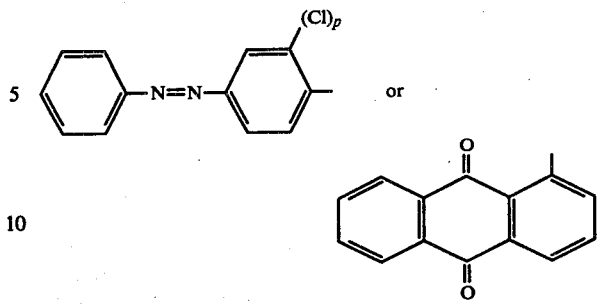
5. The fibers according to claim 1 dyed with a dye of the formula
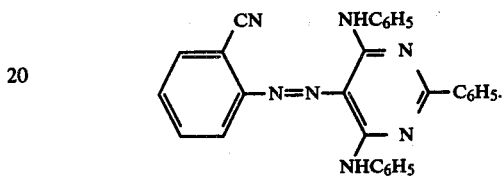
6. The fibers according to claim 1, wherein said fibers consist essentially of cotton.
7. The fibers according to claim 1, wherein said fibers comprise a mixture of cotton and polyester.
8. Printed fibers according to claim 1.
* * * * *